US012510480B2

(12) United States Patent
Ferguson

(10) Patent No.: US 12,510,480 B2
(45) Date of Patent: *Dec. 30, 2025

(54) SYSTEMS AND METHODS FOR FLUORESCENCE MICROSCOPY CHANNEL CROSSTALK MITIGATION

(71) Applicant: ARACELI BIOSCIENCES INC., Tigard, OR (US)

(72) Inventor: Kevin Ferguson, Beaverton, OR (US)

(73) Assignee: ARACELI BIOSCIENCES INC., Tigard, OR (US)

( * ) Notice: Subject to any disclaimer, the term of this patent is extended or adjusted under 35 U.S.C. 154(b) by 213 days.

This patent is subject to a terminal disclaimer.

(21) Appl. No.: 18/194,449

(22) Filed: Mar. 31, 2023

(65) Prior Publication Data

US 2024/0328948 A1    Oct. 3, 2024

(51) Int. Cl.
*G01N 21/64* (2006.01)
*G01N 21/17* (2006.01)

(52) U.S. Cl.
CPC . *G01N 21/6458* (2013.01); *G01N 2021/1765* (2013.01); *G06T 2207/10056* (2013.01); *G06T 2207/10064* (2013.01)

(58) Field of Classification Search
CPC ....... G01N 21/6458; G01N 2021/1765; G02B 21/16; G02B 21/365; G06T 2207/10064; G06T 2207/10056
See application file for complete search history.

(56) References Cited

U.S. PATENT DOCUMENTS

| | | | |
|---|---|---|---|
| 2003/0016882 A1* | 1/2003 | Riley | G01J 3/2803 382/128 |
| 2006/0146149 A1* | 7/2006 | Palum | H04N 25/134 348/E9.01 |
| 2012/0015825 A1* | 1/2012 | Zhong | G01N 21/6428 506/13 |
| 2014/0153823 A1* | 6/2014 | Lee | G06T 3/4015 382/167 |
| 2020/0249163 A1* | 8/2020 | Bierdz | G01N 21/6428 |
| 2020/0388033 A1 | 12/2020 | Matlock et al. | |
| 2023/0008899 A1* | 1/2023 | Wu | H04N 23/51 |
| 2024/0107199 A1* | 3/2024 | Numata | H04N 25/62 |
| 2024/0265682 A1* | 8/2024 | Freytag | G06T 11/001 |
| 2024/0329382 A1* | 10/2024 | Ferguson | G01N 21/6458 |

* cited by examiner

*Primary Examiner* — Jennifer D Bennett
(74) *Attorney, Agent, or Firm* — McCoy Russell LLP

(57) ABSTRACT

Methods and system are provided herein for crosstalk mitigation, such as the removal of crosstalk interference from a microscopy image signal to recover an intended image from the image signal. In one example, a method includes determining a weighted interference signal of a microscopy image by determining a weighting constant of the weighted interference signal that provides a minimum variance, removing the weighted interference signal from an overall signal, and determining the intended image signal based on removal of the weighted interference signal from the overall signal.

13 Claims, 6 Drawing Sheets

SYSTEMS AND METHODS FOR FLUORESCENCE MICROSCOPY CHANNEL CROSSTALK MITIGATION

FIELD

Embodiments of the subject matter disclosed herein relate generally to fluorescence microscopy, and more particularly to channel crosstalk mitigation in fluorescence microscopy.

BACKGROUND/SUMMARY

Various imaging technologies, such as microscopy techniques, may be used to acquire digital images of cells, biological structures, or other materials. Fluorescent dyes in a sample emit light at a lower wavelength than the light used to illuminate them. Dichroic filters are included in such microscopes to block illumination light and pass emission light. Microscopy techniques for illuminating and imaging fluorescent dyes and concurrently imaging structures are routinely used for studying complex biological structures, cells, and others. Due to a number of factors including potential chemical interactions between dyes and a sample, wavelengths of absorption or illumination and corresponding emission, and dye availability, bioassays may not be simply adjusted to accommodate a particular dichroic filter design. As a result, less than ideal matching of illumination and emission wavelengths may result in the emission spectrum of a particular fluorescent dye straddling two different emission channels.

A fluorescent dye straddling two different emission channels may result in interference if one of the channels was intended for a different fluorescent dye. This interference or signal degradation is generally referred to as channel-to-channel crosstalk. Channel-to-channel crosstalk may decrease accuracy of an image for a particular channel of an image or signal and as such may decrease usability of the information acquired from the image or signal.

Current approaches for crosstalk mitigation include image subtraction by way of a binary classification of pixels accomplished by examining and comparing pixels to determine to which channel a particular pixel belongs or calculating the expected crosstalk using all known parameters. In the former approach, while crosstalk may be determined, removal of interference is not accomplished. In the latter approach, knowledge of spectra including characterization of illumination lights, dyes, and any shifts due to chemistry, for example measured by a spectrometer or otherwise known, are demanded in order to properly calculate the expected crosstalk. If any of the parameters are unknown, the process becomes impractical.

The inventors herein have recognized the above-mentioned issues and have engineered a way to at least partially address them. In one example, a method may include determining a weighted interference signal of a microscopy image, removing the weighted interference signal from an overall signal of the microscopy image, and determining an intended image signal from the overall signal. The intended image signal is an image signal for a first channel of a microscopy system. The weighted interference signal may be a product of an unweighted interference signal from a second channel of the microscopy system and a weighting constant (e.g., a scalar constant). The weighting constant may be determined to provide a minimum variance for the recovered image signal. The overall signal may be known and/or determined by a computing system of the microscopy system and the unweighted interference signal may be known and/or determined by the computing system.

In this way, by determining the weighting constant that provides the minimum variance for the recovered image signal, the intended image signal may be recovered from the overall image signal. The methods described herein are executable by a processor of the computing system without knowledge of microscopy system specifics such as dye spectra, light source specifics (e.g., illumination magnitude, etc.), and shifts in spectra due to chemistry, among others, or demanding use of a spectrometer to measure the spectra.

The above advantages and other advantages, and features of the present description will be readily apparent from the following detailed description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 4:
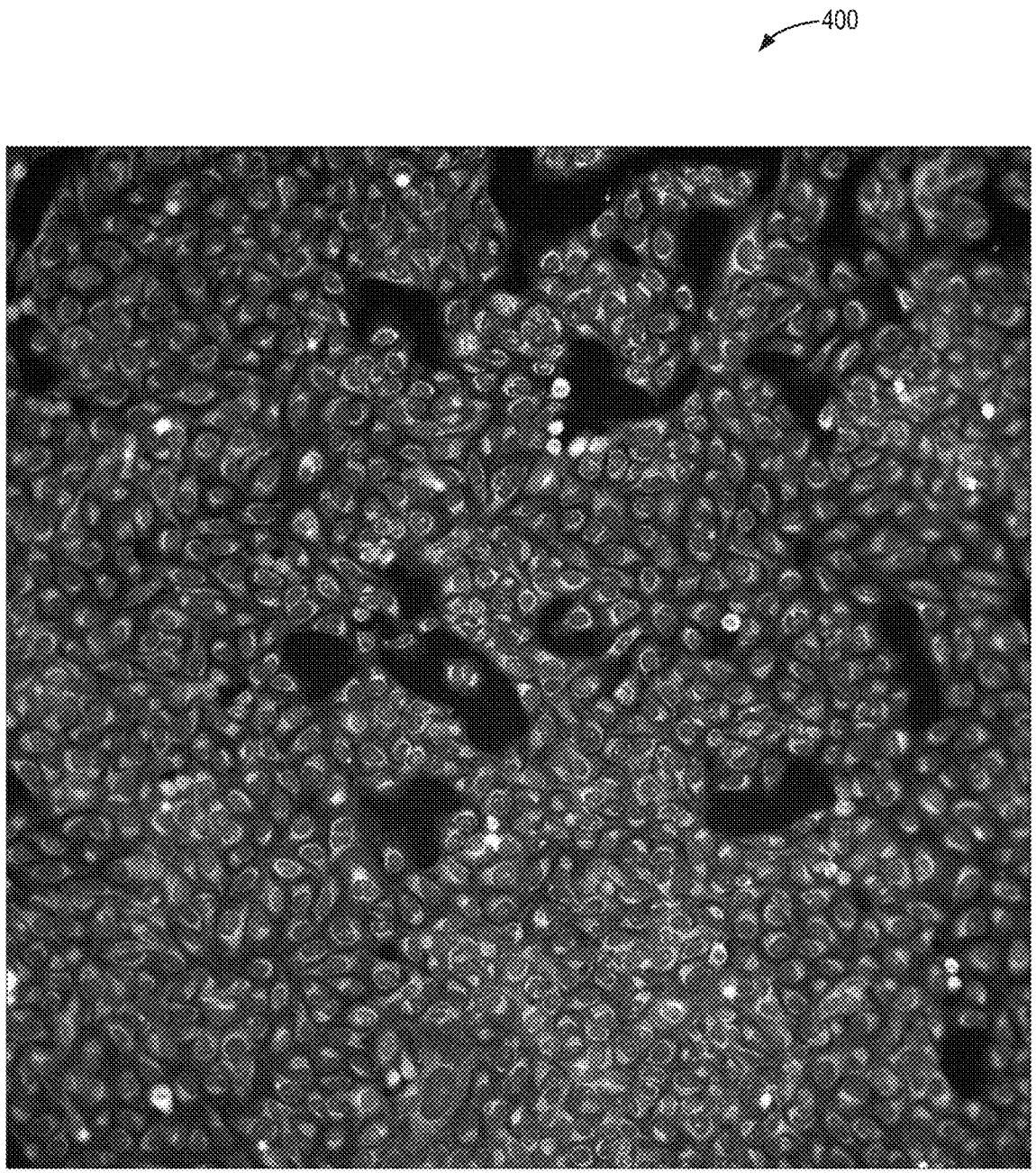
FIG. 4 shows an example of an image with crosstalk interference.
Figure 5:
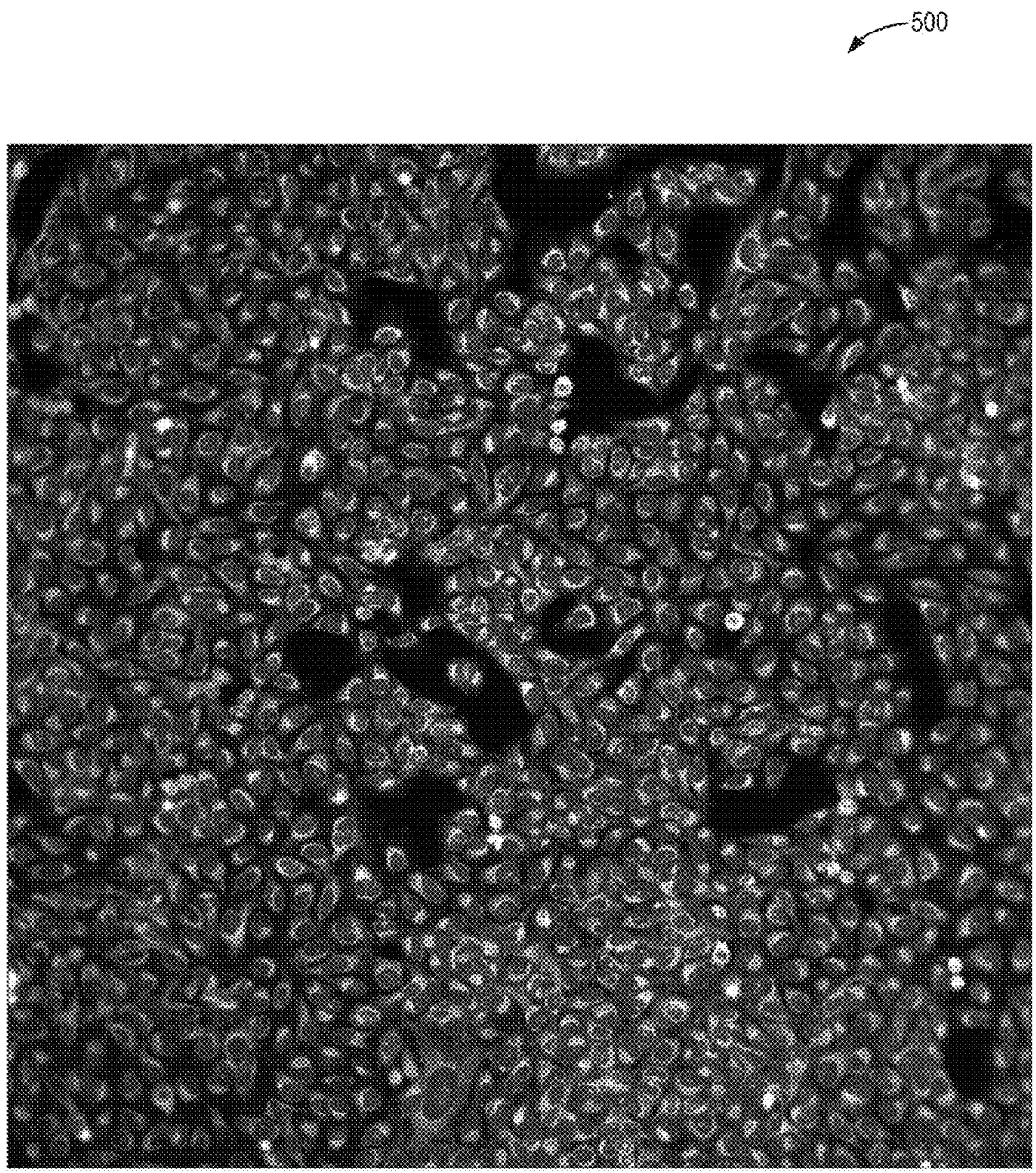
FIG. 5 shows an interfering image of the image of FIG. 4.
Figure 6:
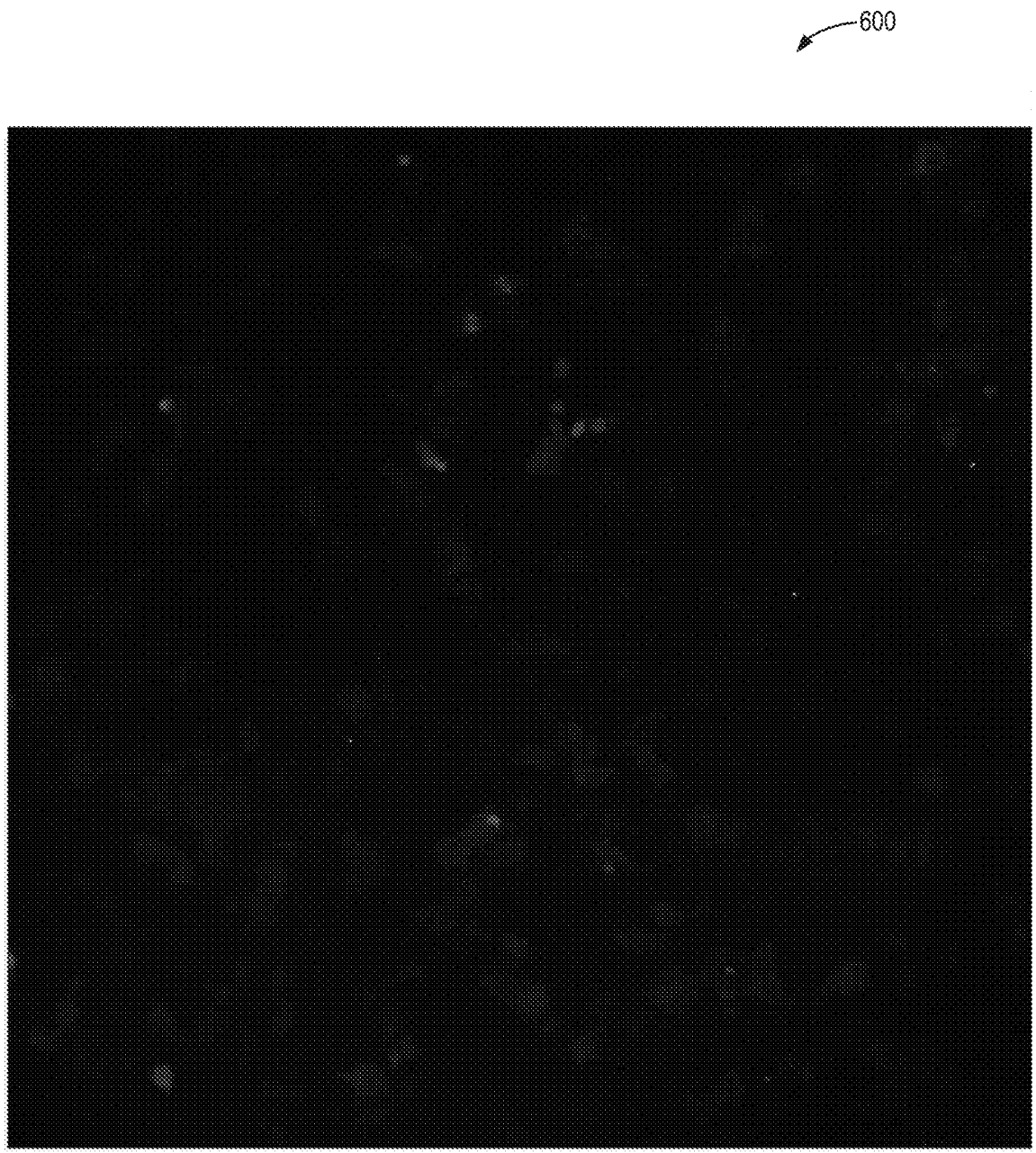
FIG. 6 shows an example of a restored image.

The present description is related to image quality of images obtained via fluorescence microscopy assemblies. Images obtained via fluorescence microscopy are subject to crosstalk interference, whereby a signal from a first channel is degraded by an interfering signal from a second channel due to a fluorescent dye straddling the first and second channels. A method for crosstalk mitigation is herein described, wherein a weighted interference signal is removed from an image signal with crosstalk interference to restore an image of the first channel. Crosstalk mitigation may be employed by a controller (e.g., a computing system) in communication with a fluorescence microscopy system, such as microscopy system 100 shown in FIG. 1. The controller may employ one or more methods, such as the methods shown in FIGS. 2-3, to remove crosstalk interference from an image and restore the image signal of the first channel. FIG. 4 shows an example of an image with crosstalk interference. FIG. 5 shows an example of an interfering image and FIG. 6 shows an example of a restored image.

Figure 1:
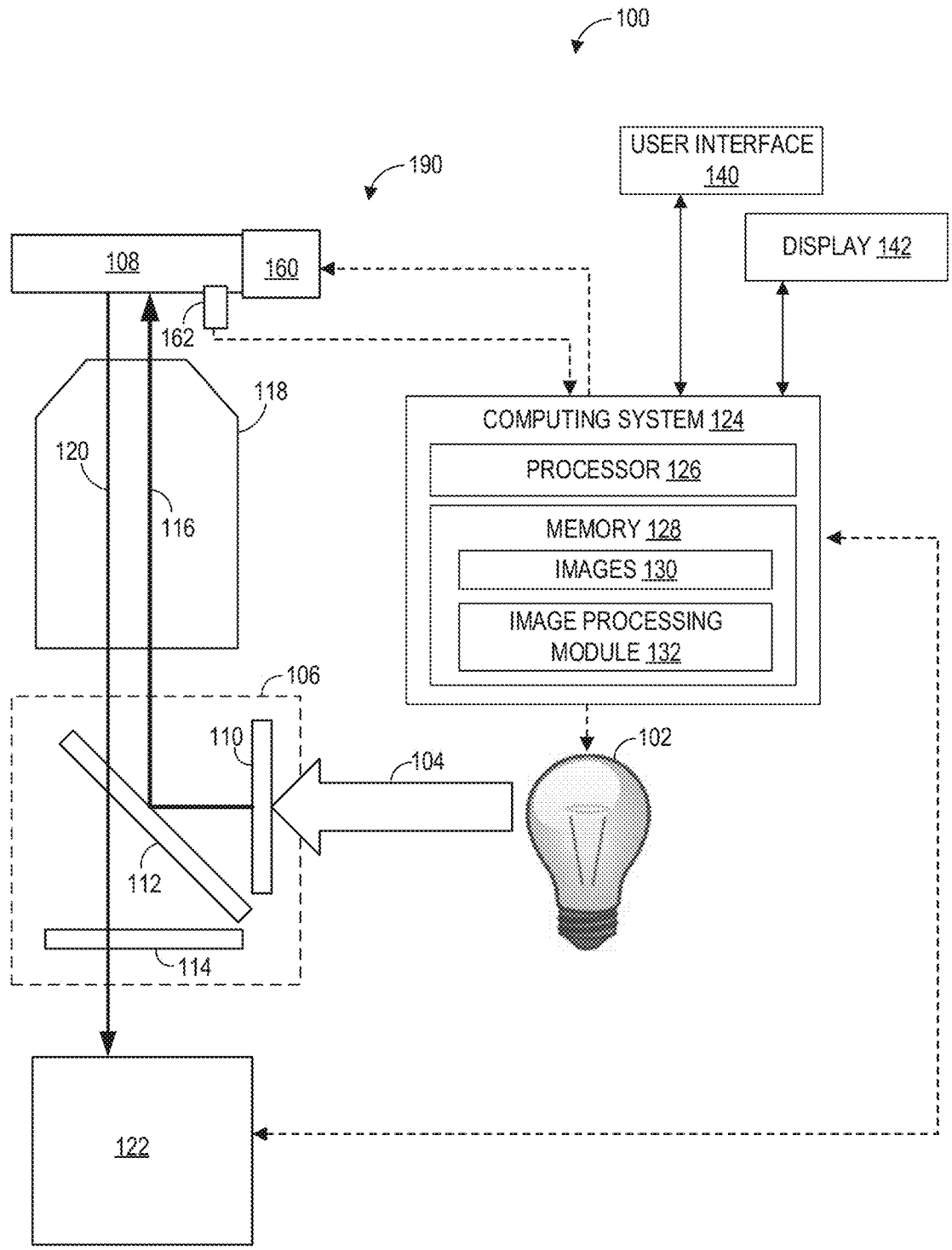
FIG. 1 shows a diagram of a microscopy system.

Turning now to FIG. 1, a schematic diagram for a microscopy system 100 (hereafter, the system 100) is shown. In one example, the system 100 may be configured as a fluorescence microscopy system. An imager 190 of the system 100 may include a light source 102 providing incident light to components arranged in a path of the incident light, as indicated by arrow 104. The light source 102 may be a mercury-vapor lamp, a xenon arc lamp, a laser, or one or more light-emitting diodes (LEDs). In some examples, the system 100 may be included in a multi-detector microscope system.

The incident light may be directed to a filter cube 106 (e.g., also called a filter block). The filter cube 106 may house components that filter the incident light such that target wavelengths are transmitted to a target to be analyzed, e.g., one or more samples supported on a sample holder 108. In one example, the sample holder 108 may be a microplate. In the example of FIG. 1, three filtering components are arranged in the filter cube 106, including an excitation filter 110, a dichroic filter 112, and an emission filter 114. The incident light may first pass through the excitation filter 110 which filters the light to allow select, e.g., target, wavelengths to continue past the excitation filter 110 and block other wavelengths of light. The target wavelengths may be wavelengths that excite electrons in specific fluorophores or fluorochromes, resulting in release of photons when the excited electrons relax to a ground state.

The excitation light, e.g., light that has been filtered by the excitation filter 110, then strikes the dichroic filter 112 (or dichroic beamsplitter), as indicated by arrow 116. The dichroic filter 112 may be a mirror, for example, arranged at a 45 degree angle relative to an optical path of the system 100, e.g., angled at 45 degrees relative to the path of incident light indicated by arrow 104. A surface of the dichroic filter 112 may include a coating that reflects the excitation light, e.g., light filtered by the excitation filter 110, but allows fluorescence emitted from the sample at the sample holder 108 to pass therethrough. The reflected excitation light, as indicated by arrow 116, passes through an objective lens 118 to illuminate the sample holder 108. If the sample positioned in the sample holder 108 fluoresces, light is emitted, e.g., generating emission light as indicated by arrow 120, and collected by the objective lens 118. The emission light passes through the dichroic filter 112 and continues to the emission filter 114, which blocks undesired excitation wavelengths from passing therethrough. The filtered emission light is received at a detector 122. The detector 122 may be a camera, such as a charge-coupled device (CCD) camera, in one example. In other examples, the detector 122 may be another type of camera, for example, a CMOS camera, or a photomultiplier tube.

At the detector 122, the emission light may be converted into electronic data. For example, when the detector 122 is the CMOS camera, the detector 122 may include a light sensor configured as a transistor on an integrated circuit. Photons of the emission light may be incident on the light sensor and generate an electrical charge that is converted into electronic data representative of a photon pattern of the emission light captured within a field of view (FOV) of the camera. The electronic data may be stored at a memory of the camera, such as random access memory, and may be retrieved by a computing system 124.

The computing system 124 may be a computing device or other computer. The computing system 124 may include a processor 126 and a memory 128. The processor 126 may comprise one or more computational components usable for executing machine-readable instructions. For example, the processor 126 may comprise a central processing unit (CPU) or may include, for example a graphics processing unit (GPU). The processor 126 may be positioned within the computing system 124 or may be communicatively coupled to the computing system 124 via a suitable remote connection.

The memory 128 may comprise one or more types of computer-readable media, including volatile and/or non-volatile memory. The volatile memory may comprise, for example, random-access memory (RAM), and the non-volatile memory may comprise read-only memory (ROM). The memory 128 may include one or more hard disk drive(s) (HDDs), solid state drives (SSDs), flash memory, and the like. The memory 128 is usable to store machine-readable instructions, which may be executed by the processor 126. The memory 128 is further configured to store images 130, which may comprise digital images captured or created using a variety of techniques, including digital imaging, digital illustration, and more. The images 130 may further include one or more reference images and/or one or more acquired images.

At least a portion of the images 130 may be acquired via the system 100. The memory 128 further includes an image processing module 132, which comprises machine-readable instructions that may be executed by the processor 126 to remove crosstalk interference from the images 130. The image processing module 132 thus contains machine-readable instructions for manipulation of digital images (e.g., the images 130), such as instructions to perform crosstalk mitigation methods. For example, the machine-readable instructions stored in the image processing module 132 may correspond to one or more methods, examples of which are provided with respect to FIGS. 2-3.

The system 100 further include a user interface 140, which may comprise one or more peripherals and/or input devices, including, but not limited to, a keyboard, a mouse, a touchpad, or virtually any other input device technology that is communicatively coupled to the computing system 124. The user interface 140 may enable a user interact with the computing system 124, such as to select one or more images to evaluate, to select one or more parameters of the imager 190, and so forth.

The system 100 further includes a display device 142, which may be configured to display results of crosstalk removal, display the images themselves, and display possible parameter options and selections related to the acquisition of images, including one or more dye wavelengths, channels, and emission spectra, for example. The user may select or otherwise input parameters via the user interface 140 based on options displayed via the display device 142.

The computing system 124 may be communicatively coupled to components of the system 100. For example, the computing system 124 may be configured to command activation/deactivation of the light source 102 when prompted based on user input. As another example, the computing system 124 may instruct adjustment of a position of the sample holder 108 to focus the excitation light on a different region of the sample holder. The computing system 124 may command actuation of a motor 160 coupled to the sample holder 108 to vary the position of the sample holder 108 with respect to the objective lens 118 and the excitation light and provide instructions on how the sample holder position is to be modified. In some examples, a position sensor 162 may monitor the actual position of the sample holder 108 and may be communicatively coupled to the computing system 124 to relay the sample holder position to the computing system 124.

The computing system 124 may also be communicatively coupled to the detector 122. As such, electronic data collected by the detector 122 may be retrieved by the computing system 124 for further processing and display at an interface, such as a computer monitor. It will be appreciated that the computing system 124 may be further coupled to other sensors and actuators of the system 100. In one example, communication between the computing system 124 and the sensors and actuators of the system 100 may be enabled by various electronic cables, e.g., hardwiring. In other examples, the computing system 124 may communicate with the sensors and actuators via a wireless protocol, such as Wi-Fi, Bluetooth, Long Term Evolution (LTE), etc.

It will be appreciated that the system 100 depicted in FIG. 1 is a non-limiting example of a fluorescence microscopy system. Other examples may include variations in quantities of individual components, such as a number of dichroic, excitation, and emission filters, a configuration of the light source, relative positioning of the components, etc. In one example, the fluorescence microscopy system, e.g., the system 100 of FIG. 1, may be used for high through-put screening of biological samples.

Figure 2:
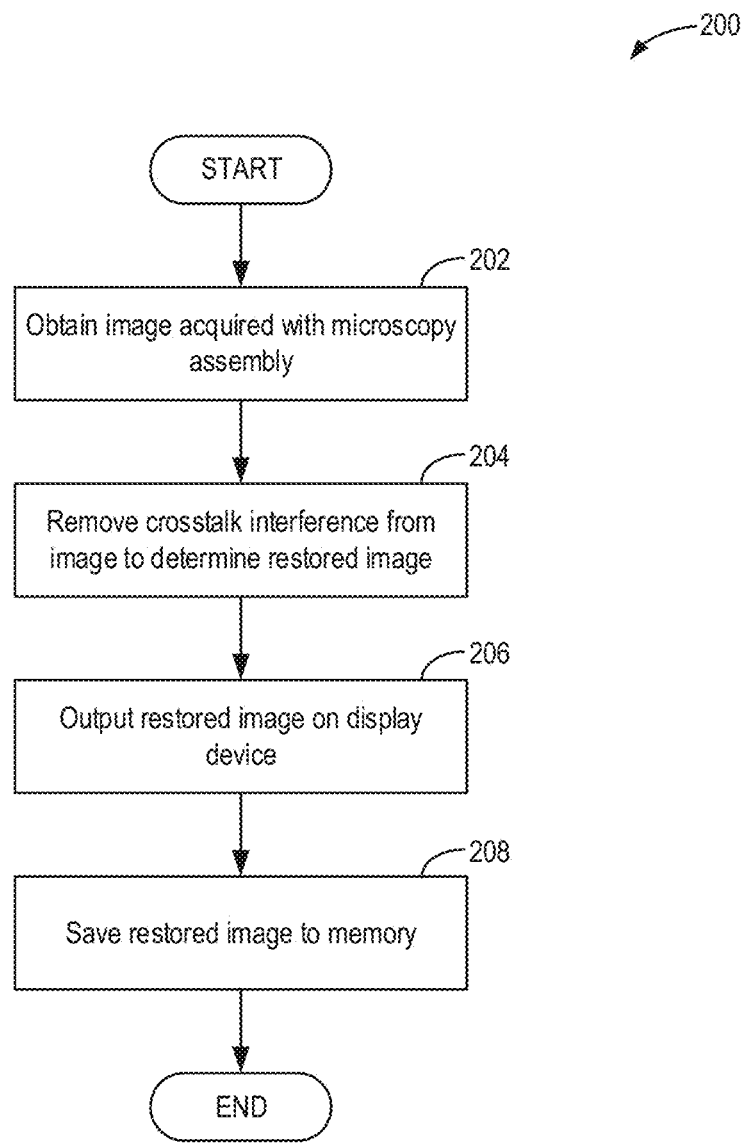
FIG. 2 shows a high-level flowchart illustrating an example method for restoring an image of a first channel.

Referring now to FIG. 2, a high-level flowchart illustrating an example method 200 for restoring an image of a first channel is shown. The method 200, and other methods included herein, may be executed by a processor of a computing system, such as the processor 126 of the computing system 124 of FIG. 1, according to instructions stored in non-transitory memory of the computing system (e.g., within the image processing module 132 of the memory 128 of FIG. 1).

At 202, the method 200 includes obtaining an image acquired with a microscopy system. The microscopy system may be the system 100 of FIG. 1 and may be configured as a fluorescence microscopy system. The image acquired by the microscopy system may be an original image that includes multiple channel signals. For example, a first channel may have a first signal and a second channel may have a second signal. The second signal may be an interference signal. Both the first and second signals may be included in the image and as a result, the image may be an image with crosstalk interference. In some examples, the image may be obtained from memory of the computing system. In other examples, the image may be obtained from external memory (e.g., an external drive such as a flash drive, optical storage device, or the like).

At 204, the method 200 includes removing crosstalk interference from the image to determine a restored image. Removing the crosstalk interference may include determining a weighted interference signal that minimizes variance, as will be described in greater detail with respect to FIG. 3. The weighted interference signal may be the second signal weighted by a constant. The weighted interference signal may be used to determine the first signal, the first signal being the signal of the restored image. The computing system herein described may include executable instructions to generate and/or construct the restored image from the first signal.

At 206, method 200 includes outputting the restored image on a display device. The display device may be the display device 142 of FIG. 1. The display device may be in communication with the computing device so as to display images generated by the computing device. The display device may display the restored image for viewing by a user. In this way, the user may be able to visualize the first signal from the first channel without the second, interfering signal as was included in the original image.

At 208, method 200 includes saving the restored image to memory. The memory may be memory 128 of the computing system 124 of FIG. 1. Saving the restored image may allow for the restored image to be used for downstream applications. For example, if more than two adjacent channels have crosstalk, the method may be repeated. As an example, the second channel may be crosstalking into the first channel, as is described above, and the first channel may be crosstalking into a third channel. In such an example, the interference from the second channel into the first channel may be removed as described above, restoring the first image of the first channel. The restored first image of the first channel may be removed from the third channel in a similar fashion.

In any iteration, an adjacent channel that is interfering (e.g., the second channel described above) but does not itself include crosstalk interference may be removed from a channel to which it is adjacent (e.g., the first channel described above). Restoration of an image (e.g., the first image) allows for that image to be removed from another adjacent image into which it is interfering. In this way, the method allows for restoration of multiple images from multiple channels.

Figure 3:
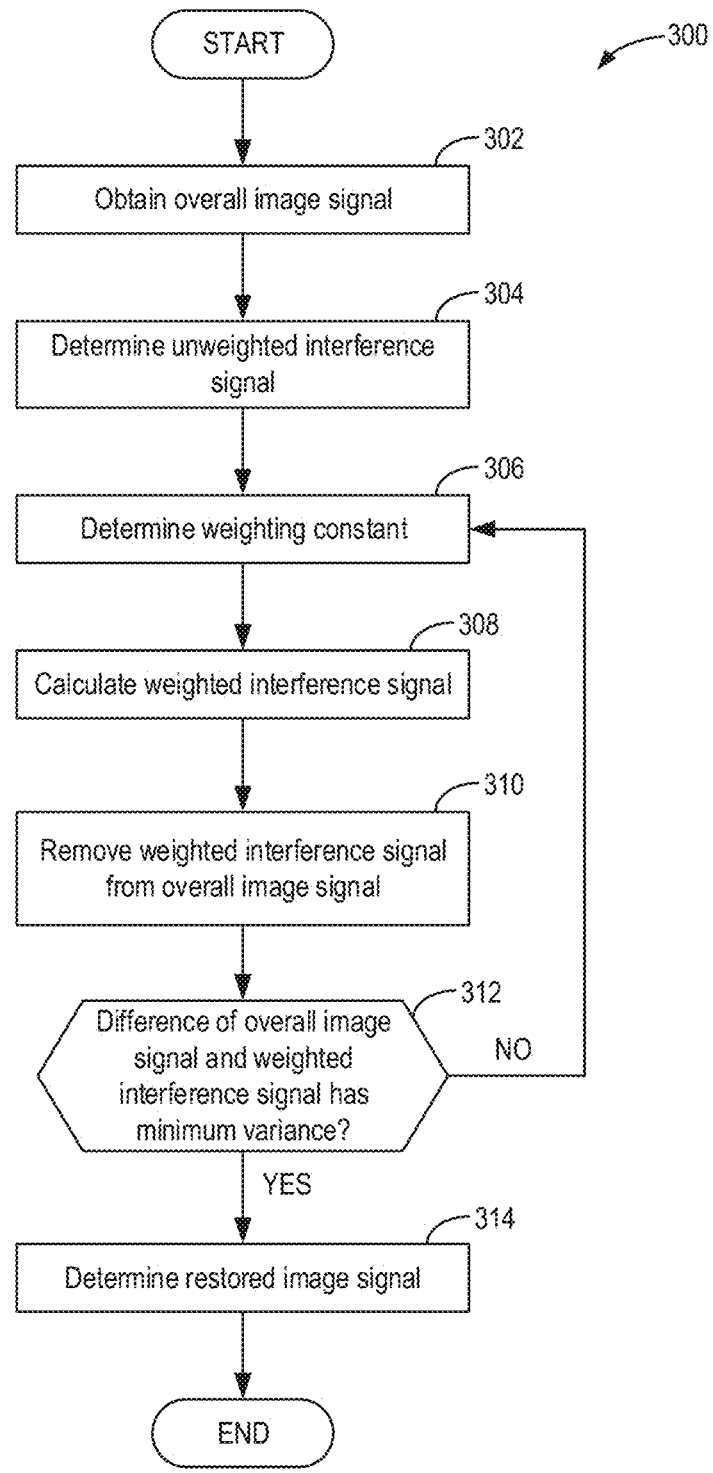
FIG. 3 shows a flowchart illustrating an example method for determining a restored image signal from an image signal with crosstalk interference.

Referring now to FIG. 3, a flowchart illustrating an example method 300 for determining a restored image signal from an image signal with crosstalk interference is shown. As noted above, the method 300 may be executed by a processor of a computing system according to instructions stored in a non-transitory memory. In some examples, the method 300 may be performed as a part of the method 200 of FIG. 2 (e.g., at 204).

At 302, method 300 includes obtaining an overall image signal. The overall image signal may be an image signal with crosstalk interference, for example the overall image may include a first channel signal and a weighted second channel signal (e.g., the overall image signal may be a sum of the first channel signal and the weighted second channel signal). The overall image signal may be known and/or determined by the computing system following acquisition of the overall image by a microscopy system (e.g., the system 100 of FIG. 1). The overall image signal may be what is outputted for the first channel, and the second channel signal may be interfering due to crosstalk, thereby creating the image signal with crosstalk interference. The overall image signal may be a real or complex number. The overall image signal value is given by equation (1):

$$I = s_1 + s_2 c \quad (1)$$

where I is the overall image signal value, $s_1$ is a first channel signal value, $s_2$ is a second channel signal value, and c is a scalar constant (e.g., a weighting constant). The product of the second channel signal value and the scalar constant may be a weighted interference signal.

At 304, method 300 includes determining an unweighted interference signal. As described, the overall image signal value may be known based on image acquisition. The second channel signal value may also be known in a similar way, as the second channel signal may not include interference from an adjacent channel. The second channel signal value may be the unweighted interference signal. Determining the unweighted interference signal may therefore include obtaining the second channel signal.

At 306, method 300 includes determining a weighting constant. The weighted interference signal may be a product of the unweighted interference signal (e.g., the second channel signal value) and the scalar constant c (e.g., the weighting constant). In order to determine the weighted interference signal, the scalar constant c may be determined that provides a minimum variance. In order to determine variance when the first signal and the second signal are approximately uncorrelated, equation (1) may be squared to provide equation (2):

$$I^2 = s_1^2 + s_2^2 c^2 \qquad (2)$$

where each of the variables are as described with reference to equation (1). When the first signal and the second signal are approximately uncorrelated, a product $2*s_1*s_2*c$ may be approximately equal to zero such that a squaring of equation (1) results in equation (2).

Determination of the scalar constant c that provides minimum variance is described by equations (3) and/or (4):

$$\min_c \left[ (I - s_2 c)^2 \right] \qquad (3)$$

$$\min_c \left( \sum (I_{(x,y)} - s_{2(x,y)} c)^2 \right) \qquad (4)$$

where (x,y) specifies a coordinate for the overall image signal and the second image signal.

At 308, method 300 includes calculating the weighted interference signal based on a determined weighting constant. The value of the scalar constant c that provides the minimum variance may be determined by an approximation of a gradient descent algorithm, whereby changes in variance are monitored with respect to changes in the scalar constant in a step wise fashion such that the resulting variances continue to decrease. Determination of the scalar constant c in such a manner is provided by equation (5):

$$\min_c \left[ \sum (I - s_2 c)^2 \right] \qquad (5)$$

where equation (5) is the same as equation (4), but does not include coordinate positions.

Alternative to determining minimum variance, in some examples, minimum energy of the recovered image signal may be determined. Similar to as described with reference to equation (2), with respect to equations (4) and (5), when the first signal and the second signal are approximately uncorrelated, the product $2*s_1*s_2*c$ or a product $2*s_1*s_2*c_2$ (both as derived when factoring the square) are approximately equal to zero. In this way, equation (1) may be taken with either equation (5) or equation (4) to determine minimum energy or variance, respectively, over c to provide equations (6) and (7):

$$\min_c \sum \left( s_1^2 + s_2^2 (c - c_0)^2 \right) \qquad (6)$$

$$\min_c \sum \left( s_{\sigma_{1(x,y)}}^2 + s_{\sigma_{2(x,y)}}^2 (c - c_0)^2 \right) \qquad (7)$$

where each of the variables are as described above, and co is a portion of the interfering signal that has been added to the signal of interest (e.g., the intended signal), wherein scalar constant c is adjustable to find the minimum variance of the recovered signal. When c and co are equal, the first signal (e.g., the recovered signal) has minimum energy or variance. Derivation with respect to minimum energy may provide equation (6) and derivation with respect to minimum variance may provide equation (7).

At 310, method 300 includes removing the weighted interference signal determined at 308 from the overall image signal. Using equation (1), the first image signal may be solved for by removing (e.g., subtracting) the weighted interference signal (e.g., the product of the second image signal and the scalar constant) from the overall image signal.

At 312, the method 300 determines if the difference of the overall image signal and the weighted interference signal has minimum variance. The difference of the overall image signal and the weighted interference signal may be the recovered image signal. The approximation of a gradient descent may allow for determining a value of the scalar constant, and consequently the weighted interference signal, that does not remove too much signal from the overall image signal. For example, a too large value of the scalar constant may result in the recovered image signal being negative, while a too small value of the scalar constant may result in not removing enough signal from the overall image signal resulting in a recovered image that still has crosstalk interference. The minimum variance may minimize these too small and too large values, aiming to determine a value for the scalar constant that removes enough interfering signal from the overall image signal to adequately recover the intended image signal. If the recovered image signal has minimum variance (YES), method 300 proceeds to 314. If the recovered image signal does not have minimum variance, for example if the weighting constant is too large or too small, as described above, method 300 returns to 306 to determine the weighting constant that provides minimum variance. This process of returning to 306 following 308 and 310 may describe the approximation of gradient descent described above, whereby values are tried sequentially until a value that provides minimum variance is reached, at which point the method 300 may proceed to 314.

At 314, method 300 includes determining a restored (e.g., recovered) image signal. The restored image signal may be the first image signal $s_1$ that is included within the overall image signal that includes crosstalk interference. Removing the weighted interference signal determines a difference between the overall image signal and the weighted interference signal. The difference may be the restored image signal. The restored image signal may be an intended signal from the first channel without crosstalk. The restored image signal, as described with reference to method 200 of FIG. 2, may then be displayed or otherwise outputted on a display device.

In this way, by determining the weighted interference signal, by way of determining a weighting constant that provides minimum variance, the first image signal may be recovered from the overall image signal that includes crosstalk interference. The methods herein described are able to be performed without needing to know spectra of fluorescent dyes used, specifics of the light source (e.g., an LED) used during imaging, or any other optical specifications of the microscopy system.

Additionally, the methods herein described may be applied to scenarios with various amounts of interference, from mild to severe. For example, interferences with resulting signal to noise ratios in the range of −20 Db may be considered severe. The methods discussed herein may recover image signals in cases where interference results in signal to noise ratios in the range of −20 Db.

As mentioned above, in some examples the overall image signal may be a first image signal that includes a second image signal of a first channel interfering into a third image signal of a second channel causing a first crosstalk interference. The third image signal may further interfere into a fourth image signal of a third channel causing a second crosstalk interference. A fifth image signal may include the third image signal and the fourth image signal. Following the method 300 described above, the third image signal may be recovered from the first image signal by removal of a first weighted interference of the second image signal. Then, using the recovered third image signal, the fourth image signal may be recovered from the fifth image signal by removal of a second weighted interference of the third image signal. In this way, the method 300 may be applied with multiple channels of crosstalk interference as long as at least one of the channel signals is not interfered by an adjacent channel. As such, each channel of multiple channels may be recovered and separated from adjacent channels without knowledge of imaging specifics (e.g., dye spectra, LED specifications, etc.).

Turning now to FIGS. 4-6, example images are shown. A first image 400 is depicted in FIG. 4, a second image 500 is depicted in FIG. 5, and a third image 600 is depicted in FIG. 6. The first image 400 of FIG. 4 may be an example of an overall image (e.g., a microscopy image) that includes channel-to-channel crosstalk interference. The second image 500 of FIG. 5 may be an example of an image of an unweighted interference signal (e.g., an interfering image). The third image 600 of FIG. 6 may be an example of a recovered image outputted following removal of crosstalk interference.

As described above, a sample imaged by a microscopy assembly (e.g., the imager 190 of the system 100 of FIG. 1) may include a fluorescent dye that emits a spectrum of wavelengths. The spectrum of wavelengths may straddle or be included in two or more channels. One of the two or more channels may be the intended channel for the fluorescent dye, while other channels of the two of more channels may be intended for other fluorescent dyes. Because the fluorescent dye emits wavelengths that are included in two or more channels however, interference occurs with a signal of another dye.

As an example, the first image 400 may be the microscopy image resultant from the spectrum of wavelengths included in two or more channels. As a result, the first image 400 may include crosstalk interference. The third image 600 may be from a first channel intended for the fluorescent dye, such as a red channel. The second image 500 may be from a second channel intended for another fluorescent dye, such as a far red channel. A signal of the second image 500 may be interfering into a signal of the third image 600, resulting in the first image 400 that includes interference due to crosstalk from the far red channel into the red channel.

The third image 600 may be recovered from the first image 400 by way of the methods provided above. A weighted interference signal of the second image 500 may be determined based on a calculated weighting constant (e.g., the scalar constant c described with reference to FIG. 3) and the signal of the second image 500. The weighted interference signal may be a measure of how much interference the signal of the second image 500 is causing the third image 600 to result in the first image 400.

A technical effect of the systems and methods provided herein is that image degradation due to channel-to-channel crosstalk in fluorescence microscopy may be mitigated by way of removing an interfering signal from an intended signal. Removal of interfering signals may allow for generation of more accurate images with reduced noise and interference. In this way, samples may be imaged by fluorescence microscopy in a more accurate way.

The disclosure also provides support for a method, comprising: determining a weighted interference signal of a microscopy image, removing the weighted interference signal from an overall signal of the microscopy image, and determining a recovered image signal based on removal of the weighted interference signal from the overall signal. In a first example of the method, the method further comprises: determining a weighting constant of the weighted interference signal that provides a minimum variance of the recovered image signal. In a second example of the method, optionally including the first example, the method further comprises: saving the recovered image signal to memory and outputting an image corresponding to the recovered image signal to a display device. In a third example of the method, optionally including one or both of the first and second examples, the weighted interference signal is a product of an unweighted interference signal and the weighting constant. In a fourth example of the method, optionally including one or more or each of the first through third examples, determining the weighting constant includes performing an approximation of a gradient descent algorithm. In a fifth example of the method, optionally including one or more or each of the first through fourth examples, the recovered image signal is a first channel signal. In a sixth example of the method, optionally including one or more or each of the first through fifth examples, the unweighted interference signal is a second channel signal. In a seventh example of the method, optionally including one or more or each of the first through sixth examples, the overall signal of the microscopy image comprises the weighted interference signal combined with the recovered image signal.

The disclosure also provides support for a microscopy system, comprising: an imager configured to acquire microscopy images of a sample, a computing device including a processor communicatively coupled to the imager, wherein the computing device is configured to execute instructions stored in non-transitory memory that, when executed, cause the processor to: obtain a microscopy image acquired by the imager, determine an overall image signal of the microscopy image, determine a weighted interference signal of the overall image signal, remove the weighted interference signal from the overall image signal to recover an intended image signal, and output the intended image signal for display on a display device. In a first example of the system, the imager is configured for fluorescence microscopy. In a second example of the system, optionally including the first example, the sample includes a fluorescent dye that emits a spectrum of wavelengths, wherein the spectrum of wavelengths is included in two or more channels. In a third example of the system, optionally including one or both of the first and second examples, the non-transitory memory includes further instructions that, when executed by the processor, cause the processor to determine an unweighted interference signal and a scalar constant, the scalar constant providing a minimum variance of the intended image signal. In a fourth example of the system, optionally including one or more or each of the first through third examples, the weighted interference signal is a product of the unweighted interference signal and the scalar constant. In a fifth example of the system, optionally including one or more or each of the first through fourth examples, the overall image signal is a sum of the weighted interference signal and the intended image signal. In a sixth example of the system, optionally including one or more or each of the first through fifth examples, the intended image signal is of a first channel of the two or more channels and the unweighted interference signal is of a second channel of the two of more channels.

The disclosure also provides support for a method, comprising: obtaining a first image signal of a microscopy image acquired by a microscopy assembly, obtaining a second image signal of a first channel, and determining a third image signal of a second channel, wherein: the first image signal includes a first crosstalk interference of the first channel into the second channel, the first crosstalk interference being a first weighted interference of the second image signal. In a first example of the method, determining the third image signal includes determining the first weighted interference of the second image signal and removing the first weighted interference from the first image signal. In a second example of the method, optionally including the first example, the method further comprises: determining a fourth image signal of a third channel, wherein a fifth image signal includes a second crosstalk interference of the second channel into the third channel. In a third example of the method, optionally including one or both of the first and second examples, determining the fourth image signal of the third channel includes removing a second weighted interference of the third image signal from the fifth image signal. In a fourth example of the method, optionally including one or more or each of the first through third examples, the microscopy assembly is configured as a fluorescence microscopy assembly.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
    determining a weighted interference signal of a first channel signal of multiple channel signals obtained from a fluorescence microscopy system while imaging a sample, the weighted interference signal comprising the first channel signal weighted by a selected weighting constant;
    removing the weighted interference signal from a second channel signal of the multiple channel signals to form a recovered image signal, wherein the selected weighting constant is selected from a plurality of possible weighting constants based on the selected weighting constant providing a minimum variance of the recovered image signal; and
    saving the recovered image signal in memory and/or displaying the recovered image signal as an image.

2. The method of claim 1, further comprising using the recovered image signal to generate a second recovered image signal of a third channel signal of the multiple channel signals.

3. The method of claim 1, wherein selecting the weighting constant includes performing an approximation of a gradient descent algorithm to determine the weighting constant that provides the minimum variance of the recovered image signal.

4. A microscopy system, comprising:
    an imager configured to acquire microscopy images of a sample,
    a computing device including a processor communicatively coupled to the imager, wherein the computing device is configured to execute instructions stored in non-transitory memory that, when executed, cause the processor to:
        obtain multiple channel signals of multiple channels acquired by the imager while imaging a sample;
        determine an overall image signal of a first channel of the multiple channels;
        determine a weighted interference signal of the overall image signal, the weighted interference signal comprising an unweighted interference signal weighted by a scalar constant;
        remove the weighted interference signal from the overall image signal to recover an intended image signal, wherein the scalar constant is selected from a plurality of possible scalar constants based on the selected scalar constant providing a minimum variance of the intended image signal; and
        output the intended image signal for storage in memory and/or display the intended image signal as an image on a display device.

5. The microscopy system of claim 4, wherein the imager is configured for fluorescence microscopy.

6. The microscopy system of claim 4, wherein the sample includes a fluorescent dye that emits a spectrum of wavelengths, wherein the spectrum of wavelengths is included in two or more channels of the multiple channels.

7. The microscopy system of claim 2, wherein the weighted interference signal is a product of the unweighted interference signal and the scalar constant.

8. The microscopy system of claim 4, wherein the overall image signal is a sum of the weighted interference signal and the intended image signal.

9. The microscopy system of claim 6, wherein the unweighted interference signal is of a second channel of the two of more channels.

10. A method, comprising:
    obtaining a first image signal of a second channel of multiple channels of a signals acquired by a microscopy assembly;
    obtaining a second image signal of a first channel of the multiple channels;
    generating a third image signal of the second channel of the multiple channels; and
    saving the third image signal in memory and/or displaying the third image signal as an image, wherein:
        the first image signal includes a first crosstalk interference of the first channel into the second channel, the first crosstalk interference being a first weighted interference of the second image signal, and generating the third image signal comprises removing the first weighted interference from the first image signal, the first weighted interference comprising the second image signal weighted by a scalar constant, the scalar constant selected from a plurality of possible scalar constants based on the selected scalar constant providing a minimum variance of the third image signal.

11. The method of claim 10, further comprising generating a fourth image signal of a third channel of the multiple channels from a fifth image signal and the third image signal, wherein the fifth image signal includes a second crosstalk interference of the second channel into the third channel.

12. The method of claim 11, wherein generating the fourth image signal of the third channel includes removing a second weighted interference of the third image signal from the fifth image signal.

13. The method of claim 10, wherein the microscopy assembly is configured as a fluorescence microscopy assembly, wherein the third image is generated without knowledge of dye spectra and light source specifications used when acquiring the multiple channels of the sample.

* * * * *